3,111,413
BORON OXIDE DERIVATIVE HIGH TEMPERATURE MARKING INK
Robert H. Black, Allison Park, Pa., assignor to The Pannier Corporation, Pittsburgh, Pa., a corporation of Pennsylvania
No Drawing. Filed Feb. 14, 1961, Ser. No. 89,109
6 Claims. (Cl. 106—20)

This invention relates to marking inks and more particularly to an ink made with a vehicle made from boron oxide derivatives and their solutions containing a heat resistance pigment.

When metal articles such as ingots, slabs, blooms or formed shapes are marked when cold with an ink ordinarily used in marking such articles, the indicia is completely eradicated when the article is brought up to working temperature.

These objects and advantages may be attained by providing an ink vehicle consisting of boron oxide derivatives and a pigment that is capable of withstanding high temperatures. This pigment must be compatible with the boron oxide derivative in solution in that it will not attack or otherwise chemically dissolve or combine with the pigment.

In carrying out this invention the boric oxide derivative is preferably employed as a methoxy boroxine or a trimethoxyboroxine both of which are liquids in themselves and are incompatible with water or water solutions. Either a boron oxide derivative such as boric acid or sodium borate may be made into a water solution as a vehicle to carry the high temperature resistive pigment.

As a high temperature resisting pigment for this ink one may employ a chromic oxide, lead chromate, titanium dioxide, lead dioxide, lead monoxide or calcium carbonate. Any one of these pigments will function to produce a color in the ink when applied to metals heated to 1800° F. The crystalline structure of these pigment oxides is compatible with the crystalline structure formed by the boron oxide derivative which lends themselves to cooperate with each other in retaining the pigment on the metal whether it is hot or cold. This compatibility is necessary to the choice of both the pigment and the vehicle.

Examples of the boron oxide derivatives having an ink vehicle together with different pigments are as follows:

(1) 1 pound chromic oxide
    3½ pounds of trimethoxyboroxine
(2) 1 pound chrome yellow
    3½ pounds of trimethoxyboroxine
(3) 1 pound $PbO_2$
    2 pounds chromic oxide
    8½ pounds trimethoxyboroxine
(4) 1 pound calcium carbonate
    3½ pounds trimethoxyboroxine
(5) 1 pound titanium dioxide
    3 pounds methoxyboroxine
(6) 1 pound $PbO_2$
    1 pound methoxyboroxine
(7) 1 pound titanium dioxide
    1 pound boric acid
    4 pounds water
(8) 1 pound titanium dioxide
    1 pound sodium borate
    4 pounds water It is possible to interchange any of the foregoing pigments with any of the foregoing vehicles that are not already shown in combination.

These pigments are shown because of their refractive index as well as their crystalline structure for the purpose of providing a good depth of color or opacity. These crystalline pigments form a group that have common attributes such as; they are all nonreactive with the boron oxide derivatives providing the vehicle to the ink, and they are opaque and can withstand high temperatures.

In mixing these inks the pigments and the vehicle are thoroughly mixed into the solutions and are preferably ground in a mill to thoroughly disperse the same. The fluidity of the vehicle determines the thickness of the solution of the ink. This ink may be applied by stamping with the stamps made of rubber or synthetics such as silicon rubber. A metal stamp may be employed if it is provided with an engraved face for transferring the ink to the object. Again the ink may be sprayed on the metal or stenciled or applied as free writing.

The ink comprising this invention may be applied under temperature conditions of 2° F. to 1950° F.

The marked article may be dipped in a pooling bath to remove the ink marking without injury to the article.

Although this ink is particularly valuable for use in marking hot metals or metals to be heated it is equally applicable to ceramics, glass or any product that can withstand temperatures approximating 2000° F. It is also usable on porous materials that cannot stand high temperatures.

I claim:

1. A marking ink consisting of one pound of chromic oxide and three and one-half pounds of liquid trimethoxyboroxine.

2. A marking ink consisting of one pound of chrome yellow and three and one-half pounds of liquid trimethoxyboroxine.

3. A marking ink consisting of one pound of $PbO_2$, two pounds of chromic oxide and eight and one-half pounds of liquid trimethoxyboroxine.

4. A marking ink consisting of one pound of calcium carbonate and three and one-half pounds of liquid trimethoxyboroxine.

5. A marking ink consisting of one pound of titanium dioxide and three pounds of liquid methoxyboroxine.

6. A marking ink consisting of one pound of $PbO_2$ and one pound of liquid methoxyboroxine.

References Cited in the file of this patent
UNITED STATES PATENTS

| | | |
|---|---|---|
| 2,090,618 | Bley | Aug. 24, 1937 |
| 2,663,658 | Schurecht | Dec. 22, 1953 |
| 2,723,205 | Gallup | Nov. 8, 1955 |
| 2,785,091 | Rex | Mar. 12, 1957 |

OTHER REFERENCES

Chem. and Eng. News, volume 36, No. 29, July 21, 1958, pages 112–113, "Borester Boric Acid Esters."

Condensed Chemical Dictionary, published 1950, by Reinhold, N.Y.C. (page 106).